United States Patent
Brown

(10) Patent No.: US 11,870,311 B2
(45) Date of Patent: Jan. 9, 2024

(54) APPARATUS AND METHODS FOR MANUFACTURING HIGH-DENSITY COIL WITH FORMED COOLING CHANNELS

(71) Applicant: Ian Patrick Brown, Evanston, IL (US)

(72) Inventor: Ian Patrick Brown, Evanston, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 126 days.

(21) Appl. No.: 17/157,396

(22) Filed: Jan. 25, 2021

(65) Prior Publication Data

US 2021/0234424 A1    Jul. 29, 2021

Related U.S. Application Data

(60) Provisional application No. 62/965,870, filed on Jan. 25, 2020.

(51) Int. Cl.
| | |
|---|---|
| *H02K 3/28* | (2006.01) |
| *H02K 3/24* | (2006.01) |
| *H02K 15/00* | (2006.01) |
| *H02K 1/20* | (2006.01) |

(52) U.S. Cl.
CPC .............. *H02K 3/24* (2013.01); *H02K 1/20* (2013.01); *H02K 3/28* (2013.01); *H02K 15/0093* (2013.01)

(58) Field of Classification Search
CPC ........ H02K 3/18; H02K 15/0093; H02K 1/20; H02K 3/24; H02K 15/0442; H02K 3/28
See application file for complete search history.

(56) References Cited

U.S. PATENT DOCUMENTS

| | | | | |
|---|---|---|---|---|
| 10,164,490 B2* | 12/2018 | Tsuiki | ...................... | H02K 3/28 |
| 2006/0043801 A1* | 3/2006 | Adra | ......................... | H02K 3/24 |
| | | | | 310/54 |
| 2018/0233998 A1* | 8/2018 | Lange | ..................... | H02K 15/12 |
| 2021/0249925 A1* | 8/2021 | Müller | ..................... | H02K 3/28 |

* cited by examiner

*Primary Examiner* — Leda T Pham
(74) *Attorney, Agent, or Firm* — Pauley Erickson & Swanson

(57) ABSTRACT

A conductive coil for an electric application having a cooling channel for a coolant liquid or gas. The coil includes a wire winding of a plurality of wire turns. The wire winding is compressed about a cooling channel which is disposed between adjacent turn segments of the plurality of wire turns. The wire winding is formed and pressed against a shaping element to form the coolant channel within the compressed winding.

20 Claims, 7 Drawing Sheets

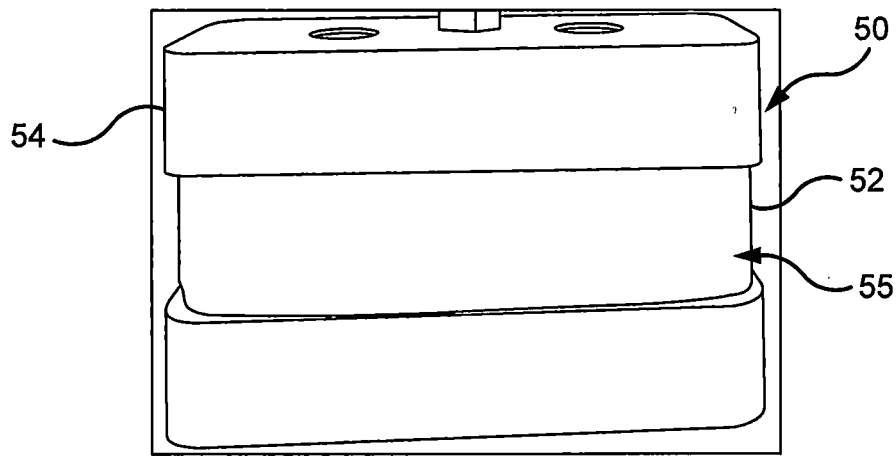
FIG. 3
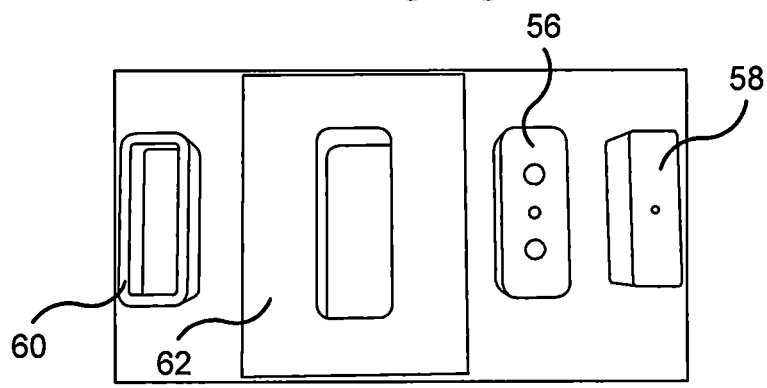
FIG. 4
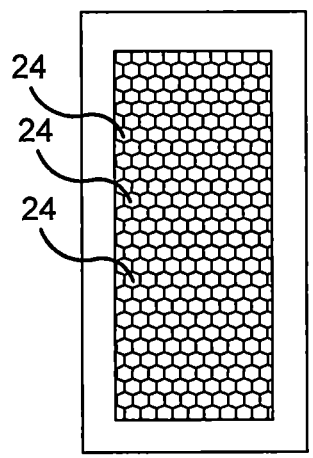 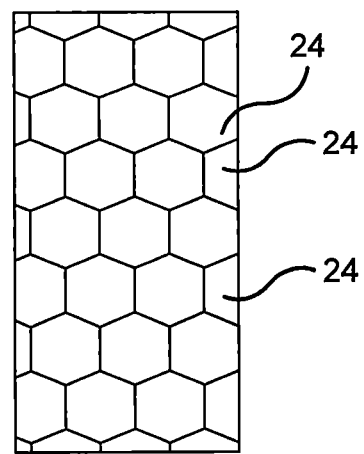
FIG. 5    FIG. 6

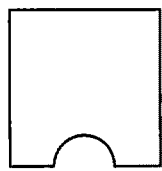 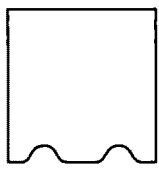 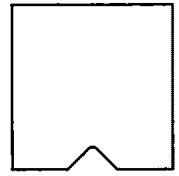 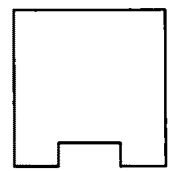
FIG. 12A    FIG. 12B    FIG. 12C    FIG. 12D
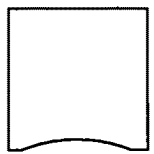 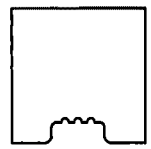 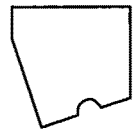
FIG. 12E    FIG. 12F    FIG. 12G
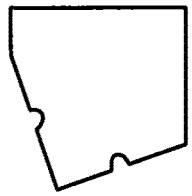 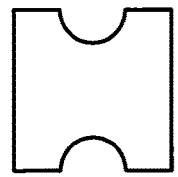
FIG. 12H    FIG. 12I
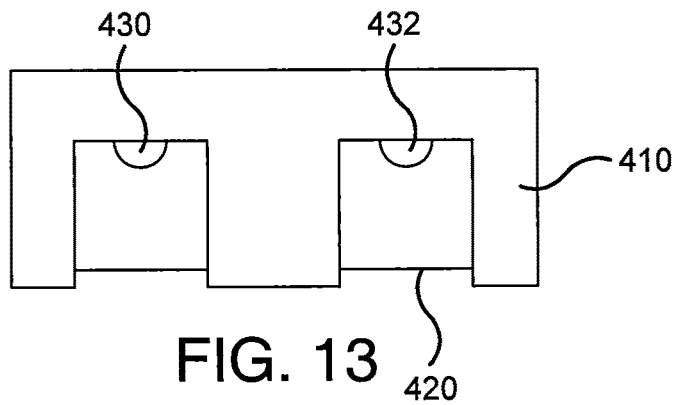
FIG. 13
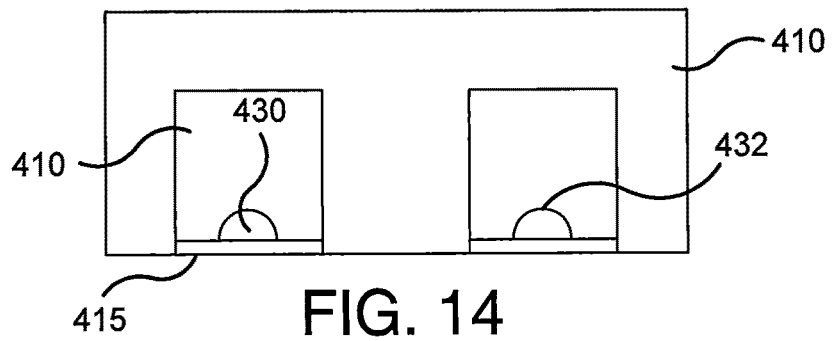
FIG. 14

APPARATUS AND METHODS FOR MANUFACTURING HIGH-DENSITY COIL WITH FORMED COOLING CHANNELS

CROSS REFERENCE TO RELATED APPLICATION

This application claims the benefit of U.S. Provisional patent Application, Ser. No. 62/965,870, filed on 25 Jan. 2020. The provisional application is hereby incorporated by reference herein in its entirety and is made a part hereof, including but not limited to those portions which specifically appear hereinafter.

STATEMENT REGARDING FEDERALLY SPONSORED RESEARCH

This invention was made with government support under DE-EE0007798 awarded by US Department of Energy (DOE). The government has certain rights in the invention.

FIELD OF THE INVENTION

This invention relates generally to electric machine coils and methods for manufacturing and, more particularly, wound coils with enhanced cooling features for use in electric machines or motors, and methods of producing such coils. The invention further relates to electric machines incorporating the coils.

BACKGROUND OF THE INVENTION

Electric machines are widely used when electrical energy is converted to mechanical energy or vice versa. Heat is generated in electric machines through ohmic losses in the coils of the electric machine. The coils in electric machines are typically wound from copper or aluminum wire, or equivalent, which have a finite resistance. As current flows in the wires their temperature rises to a level depending on the cooling or thermal management. The temperature rise of the windings should remain below the rated temperature of the insulation of the wire or other insulators in the machine. The torque and power density of electric machines is generally limited by the current densities or current loadings, which are in turn limited by the cooling of the electric machine. For the highest performance electric machines generally, liquid cooling is used. The liquid can be provided through a jacket surrounding the electric machine, through openings in the stator laminations, through the slots holding the windings, or sprayed on the end turns of the coils.

There is a continuing need for improved cooling of windings. In addition, there is a need for high slot fill of windings (the amount of copper cross-sectional area as a proportion of the slot area), and/or improved efficiency of electric machines.

Several methods have been proposed to increase the packing factor or slot fill of windings, including needle winding, segmentation of laminations (stators and/or rotors) to allow for bobbin winding, square or rectangular cross-section bar or hairpin windings, and die compression of the windings to form them into a solid mass without air voids. Die compressed windings have been proposed for use in the stator of a fractional slot concentrated winding soft magnetic composite permanent magnet servo motor. Die compressed windings have further been explored for use in switched reluctance machines. Aluminum and stranded Litz wire die compressed windings have also been utilized for the stator windings of light weight permanent magnet synchronous machines. Die compression of coils has also been used to construct a high slot fill wound field synchronous machine field winding.

SUMMARY OF THE INVENTION

A general object of the invention is to provide an improved coil winding for electric applications, such as, without limitation, an electric motor coil, an inductor coil, a reactor coil, or a transformer coil. The coil winding includes a channel feature that allows a coolant fluid to pass over and/or through the coil when installed. The coolant channel can be formed in an outer surface of the coil, such as cut or etched in a surface, formed by casting or additive manufacturing, or press-formed in a compression step via displacement of individual coil wires.

The general object of the invention can be attained, at least in part, through a coil for an electric application. The coil includes a winding including a plurality of winding turns of at least one coil element wound about a winding axis. The winding comprises a cooling channel extending a length of the winding, in a direction substantially perpendicular to the winding axis, such as from one end to an opposite end.

In embodiments of this invention, the winding is formed of a plurality of wire turns, or sub-turn strands in hand, and the coil includes a wire winding with a cooling channel disposed between adjacent turn segments of the plurality of wire turns. The wire winding can be compressed at least partially about the cooling channel.

In embodiments of this invention, an outer side of the winding comprises a channel groove forming the cooling channel Additionally or alternatively, the channel can run through the winding, such as fully surrounded by wire turn segments. In some embodiments of this invention, the cooling channel is formed between at least two protuberances (e.g., longitudinal ribs) extending from, or otherwise raised above, an outer side surface of the winding.

The channel groove or protuberances can be placed against a support surface, such as a stator lamination stack. Alternatively, a separate cover element can be placed over the shaped element(s) to close the channel(s). A manifold can be disposed over at least one end side of the winding, e.g., at a turn end, and connected to the cooling channel, to introduce the cooling fluid into the cooling channel.

The invention further includes a coil for an electric application including a compressed wire winding including a plurality of wire turns of at least one wire wound about a winding axis. The wire winding is compressed at least partially about a cooling channel. The cooling channel is press-formed into the wire winding between adjacent turn segments of the plurality of wire turns. The press-fitting compression displaces the wire segments about a shaping element in a die press.

The invention further includes a method of forming a coil for an electric application. The method includes steps of winding a wire about a bobbin element to obtain a wire winding; and compressing the wire winding against a shaping element. The shaping element forms a channel in the wire winding (e.g., on a surface or an internal channel). The coil can then be inserted into a stator frame. A manifold can be placed or over-molded onto a coil end, to introduce a coolant to the cooling channel.

Other objects and advantages will be apparent to those skilled in the art from the following detailed description taken in conjunction with the appended claims and drawings.

BRIEF DESCRIPTION OF THE DRAWINGS

FIGS. 3 and 4 shows die pressing components, according to one embodiment of this invention.

FIGS. 5 and 6 show sectional views of compressed wire winding segments, according to one embodiment of this invention.

FIGS. 12A-12I each show a cross sectional view of a coil cooling channel, according to embodiments of this invention.

FIGS. 13 and 14 each show a coil installation, according to embodiments of this invention.

DETAILED DESCRIPTION OF THE INVENTION

The present invention provides a coil winding, for use as, for example, an electric motor coil, an inductor coil, a reactor coil, or a transformer coils. Exemplary coils are commonly referred to as a field coil/winding, an armature coil/winding, a stator coil/winding, a rotor coil/winding, etc. Coils of this invention provide for higher torque and power density in electric machines. Example applications include pure or hybrid electric vehicles, electric aircraft, electric drones, generators, servo motors, etc.

The invention further includes an apparatus and method for die compression as a means for increasing slot fill and providing a cooling functionality. The advantages of the invention include providing coils or windings using higher current densities due to improved heat transfer and thermal management. The coils of this invention desirably have both a high slot fill (the amount of copper cross-sectional area as a proportion of the slot area) and a press-formed cooling channel for through-slot fluid (e.g., gas or liquid) cooling. Better cooling of the windings can also improve the efficiency of electric machines.

Coil embodiments of the invention include at least one cooling channel, each allowing for a flow of a liquid or gas coolant. The cooling channel(s) are desirably formed during the manufacturing of the high-density coils. The cooling channel features allow for direct cooling of the conductors in the coil with no additional thermal interfaces to maximize the heat transfer. If direct liquid or gas cooling is not desired, the formed channel can be coated or inserted with another channel element, e.g., a tube, to encapsulate the coolant.

Embodiments of the invention include one or more cooling channels formed in the coil/winding through the use of a compression die. The die compressed windings have a high slot fill factor, i.e., the proportion of conductor to the non-conductor area is high. A high compression force is used, and the conductors may deform, in the process to reduce or eliminate air voids. The deformation of the conductors and elimination of the air voids can also prevent leakage of the liquid or gas in the formed channels. Additional encapsulant maybe used to seal any leakage. The position and shape of the formed channel can vary depending on need or other factors such as the winding configuration, e.g., a single or double layer in an electric machine slot or if multiple subcoils are used in the slot.

Figure 1:
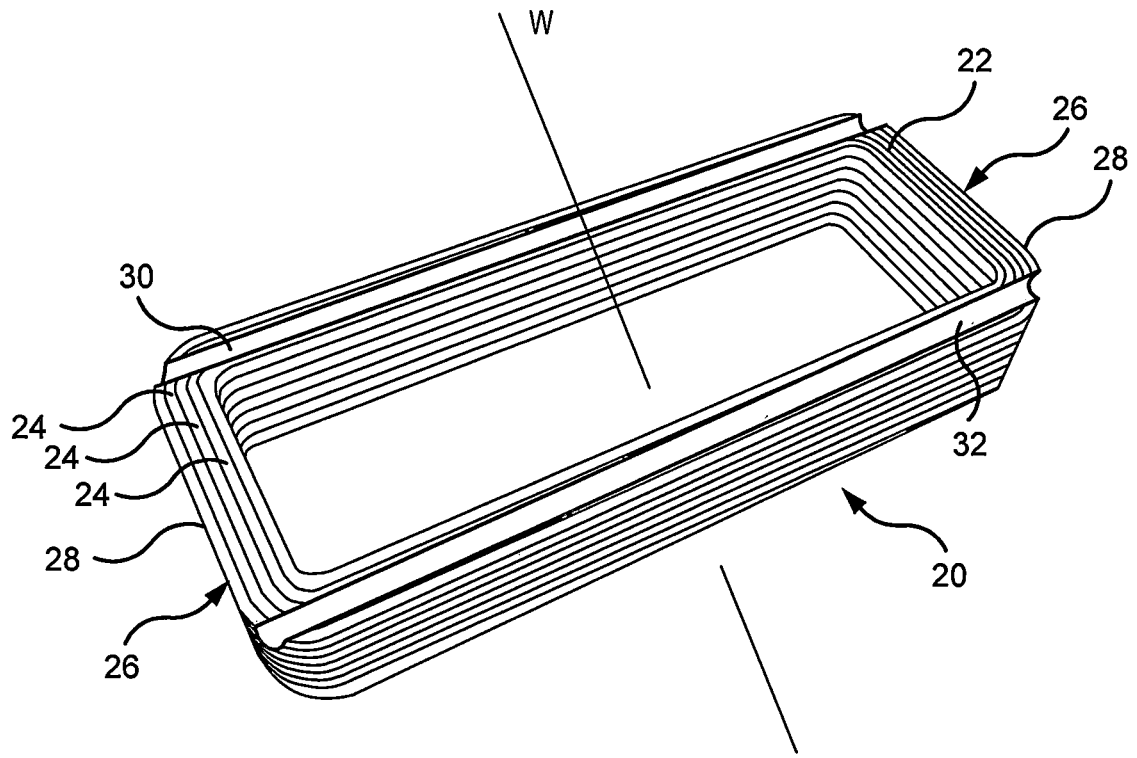
FIG. 1 shows a perspective view of a coil for an electric machine, according to one embodiment of this invention.
Figure 2:
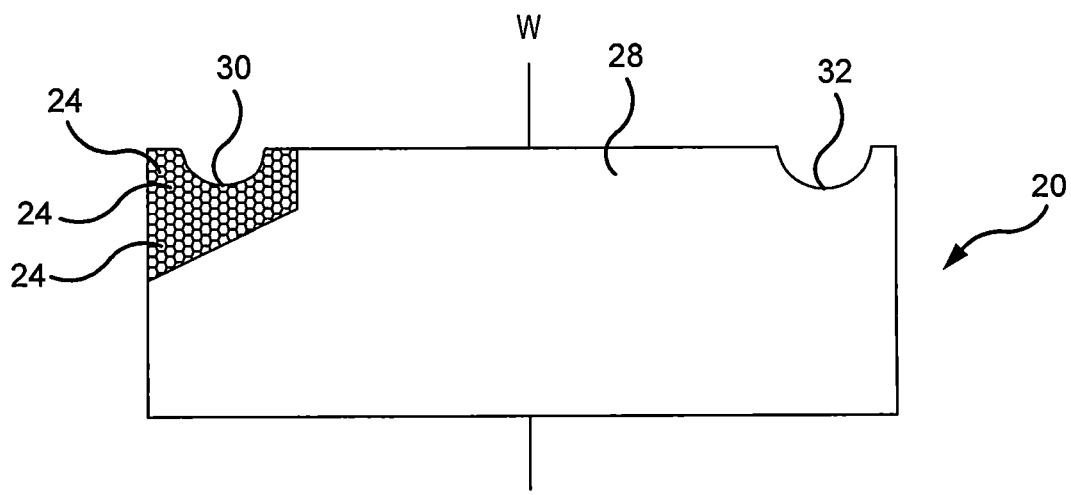
FIG. 2 is a partial sectional end view of the coil of FIG. 1.

FIGS. 1 and 2 show a coil 20 according to one embodiment of the invention. The coil 20 includes a bundle of wire(s) forming a wire winding 22, such as one or more insulated wires 24 wound around a winding axis W, so as to form a plurality of superposed turns 26. The winding 22 has a longitudinal dimension that extends substantially perpendicularly to the winding axis W of the coil 20. The wire winding bundle is desirable compressed to form the winding 22, as discussed further below.

The coil 20 includes two cooling channels 30 and 32. The cooling channels 30 and 32 are formed as a channel groove in an outer side surface of the wire winding 22. The channel groove extends a full length of the coil 20, perpendicular to the winding axis W, and is open at turn ends 28 of the coil 20, as best shown in FIG. 2. By extending between the two turn ends, the cooling channel allows a coolant fluid to be introduced at one side of a stator, etc. (not shown), and exit at the opposing side of the stator.

FIG. 2 is a partial sectional end view of the coil 20. The cooling channels 30 and 32 are formed during the compression of the wire winding 20, by a shaped surface in the compression element that displaces the wires to form the cooling channels 30 and 32. As seen in FIG. 2, the cooling channel 30 is formed by displacing the individual wires 24 to form the channel 30. The channel 30 is thus partially surrounded by segments of the individual wires 24 along the longitudinal direction.

FIGS. 3 and 4 show an exemplary compression die set 50 and process for a coil 55. FIG. 3 shows coil bundle 55 formed by winding wire 52 on a bobbin 54. In FIG. 3 the coil turns are retained on the top and bottom by part of the overall die set 50 and the punch. This is not necessarily needed in all compression die schemes. The bobbin 54 with the coil turns and the punch are inserted into the die. The components of the die including the bobbin 54 are shown in FIG. 4. From left to right the components include the punch 60, the die 62, the bottom bobbin 56 (also forms part of the die cavity), and the top bobbin 58 on which the coil turns are wound. The entire die set is inserted into a press for compression. The punch 60 can be seen extending above the die 62 before compression. The coil is compressed and then extracted from the die 62. The density of the wire packing is increased in the coil. If round wires are used, they may deform to become approximately hexagonal. Voids between wires are thus reduced. A cross section of one coil side of a die compressed coil is shown in FIGS. 5 and 6, which corresponds to the sectional view in FIG. 2.

Figure 7:
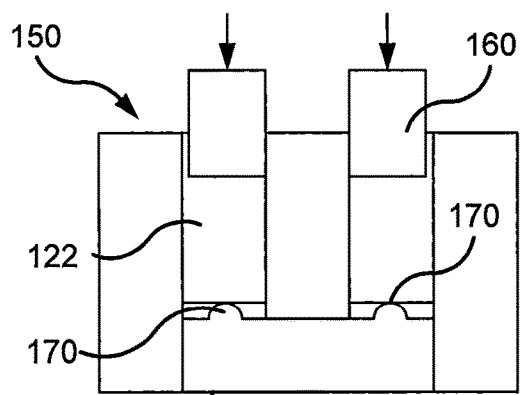
FIGS. 7 and 8 illustrate a winding compression, according to one embodiment of this invention.
Figure 8:
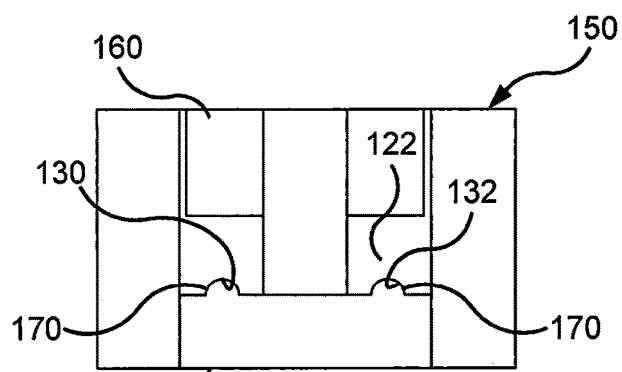
Figure 9:
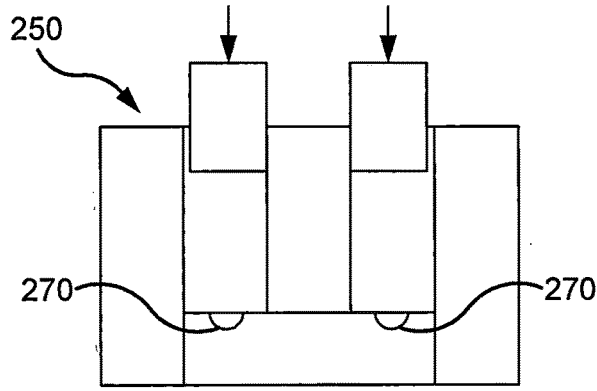
FIGS. 9 and 10 illustrate a winding compression, according to one embodiment of this invention.
Figure 10:
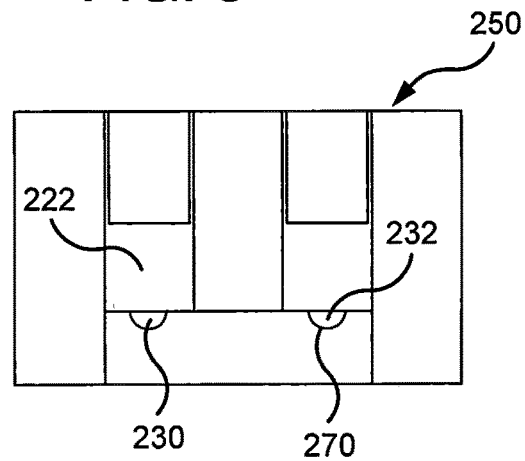

The appropriate surface of the die component corresponding to the side(s) of the coil where the channel is desired will have a shaped surface to displace the compressed wire segments and form the cooling channel. The shaped feature(s) that form the cooling channel maybe positive or negative. As shown in FIGS. 7 and 8, die set 150 includes a bottom plate or bobbin 156 including a positive shaping elements 170, forming channel grooves 130 and 132 in the wire winding 122 when pressed by punch 160 against the elements 170. FIGS. 9 and 10 show a die set 250 with a negative element 270, that results in protuberances 230 and 232 on the outer side surface of the wire winding 222 when compressed. Additional shaping objects may be added to the compression die to form the coil. The number of the compression directions also can vary if the shaping object potentially needs to move in the die.

Positive or negative features are added to the surfaces of compression dies to form channels or protuberances to carry liquid or gas coolants. The surface of the compression die may also be textured to enhance the heat transfer properties of the coil through increased surface area and the formation of turbulence, such as within or external of the channel(s). In addition to features added to the surface of compression dies, additional shaping objects can be inserted into the compression dies to form channels inside the coils.

Figure 11:
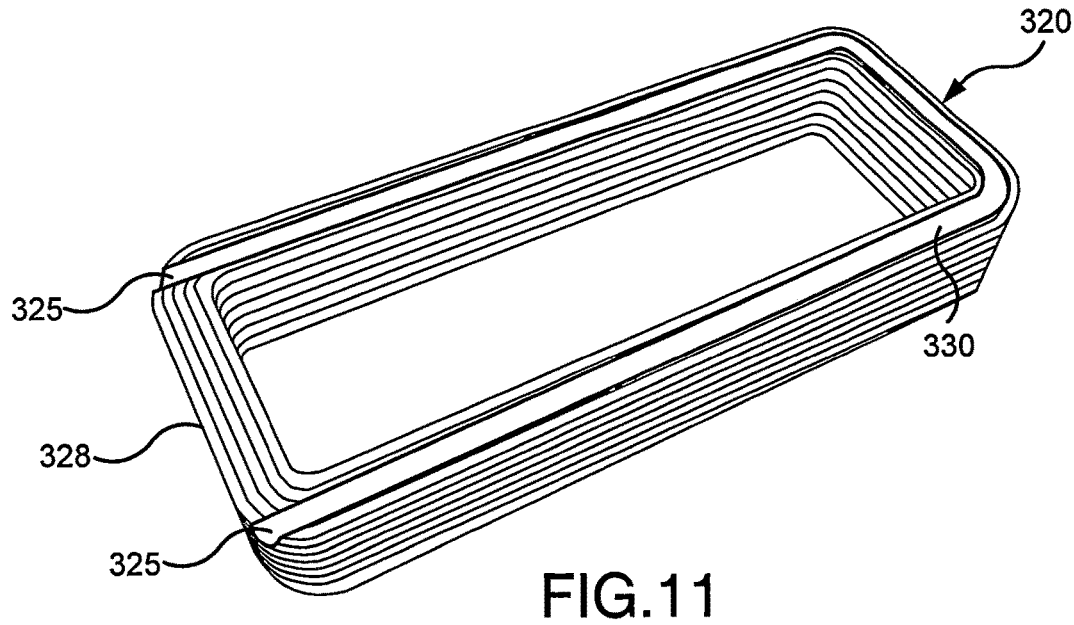
FIG. 11 shows a perspective view of a coil for an electric machine, according to one embodiment of this invention.

Various sizes, shapes, amounts, and/or configurations of the cooling channels are available, depending on need. The cooling channels can be straight or curved, and extend in one or more surfaces, such as, for example, wrapping around more than one side for example, a helical configuration. FIG. 11 shows one exemplary embodiment, including a single U-shaped channel 330 that extends about the outer, upper surface of the coil 320, with two side openings 325 on the same turn end 328. FIGS. 12A-I show various channel configurations in cross-section. FIG. 12A shows a single curved, semi-circular channel FIG. 12B shows a double channel, which can be fully separate or interconnected. FIG. 12C shows a triangular channel FIG. 12D shows a rectangular channel FIG. 12E shows a wider and less deep channel FIG. 12F shows a multi-faceted shape, with a primary rectangular shape and secondary semi-circular extensions. FIG. 12G shows an alternatively shaped winding, with an angled side. FIGS. 12H and 12I show channels in two sides of the coil, with FIG. 12H showing channels in two adjacent side, and FIG. 12I showing channels in opposing side surfaces. An advantage of having the cooling channel directly formed in the coil is a minimization of the number of thermal interfaces. Losses generated in the coil can be directly removed.

In embodiments of this invention, the coil is placed into the support structure (e.g., stator or equivalent) with the cooling channel facing a surface of the support. FIG. 13 representatively shows a coil 420 in a stator frame 410 (e.g., a lamination stack), where the cooling channels 430 and 432 face the stator frame 410. The stator frame 410 thus forms a closing cover for the channels 430 and 432 to keep the coolant within the channels 330 and 332. FIG. 14 illustrates a reverse positioning in stator frame 410, where a separate cover element 415, such as a slot liner or a slot opening edge, is used to cover the cooling channels 430 and 432. The closure of cooling channels in fully enclosed slots can also be accomplished by introducing joints in the laminations. A suitable coolant flow can be supplied to the channels at the exposed coil ends, such as by simply blowing air over the ends, or using a delivery manifold applied over the coils ends.

Figure 15:
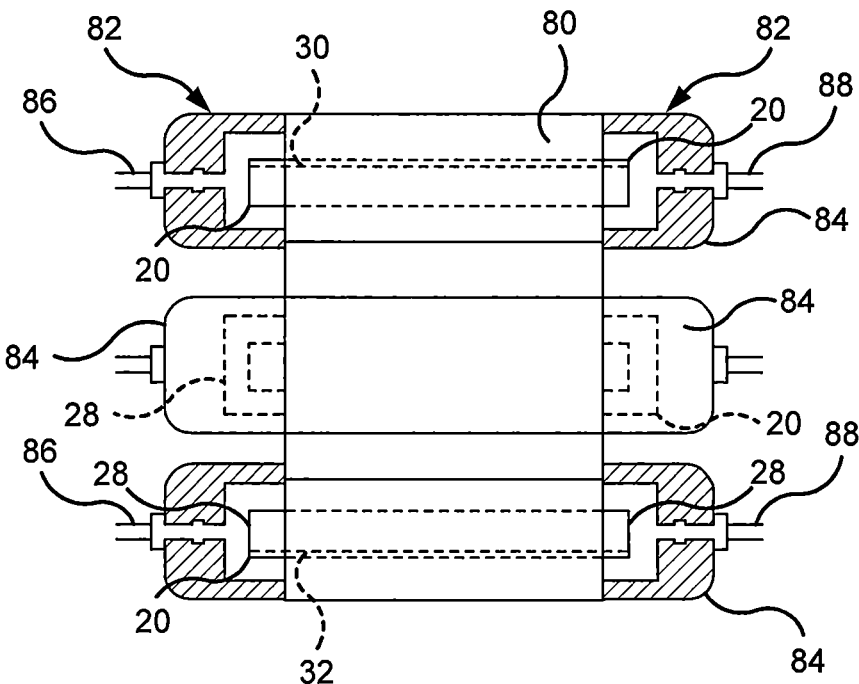
FIG. 15 illustrates a sectional view of an exemplary manifold according to one embodiment of this invention.
Figures 16A, 16B, 16C:
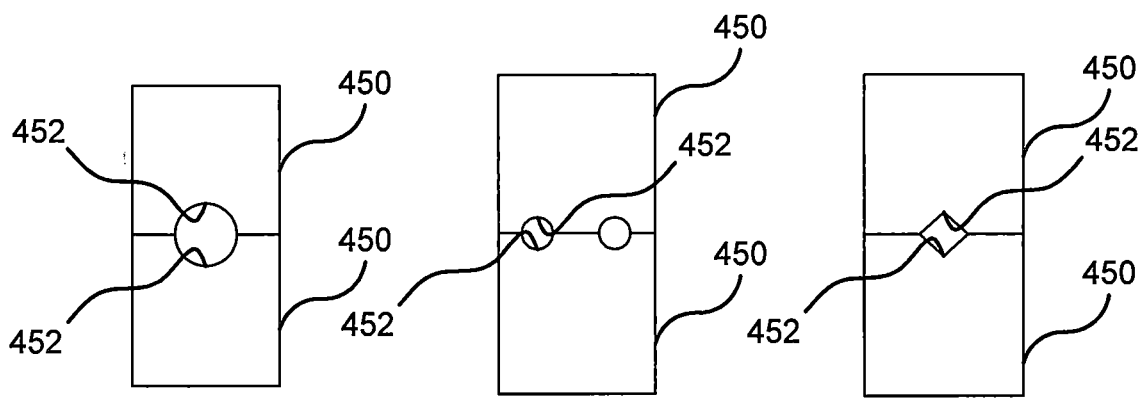
FIGS. 16A-16F each show a cross sectional view of a coil cooling channel, according to embodiments of this invention.
Figures 16D, 16E, 16F:
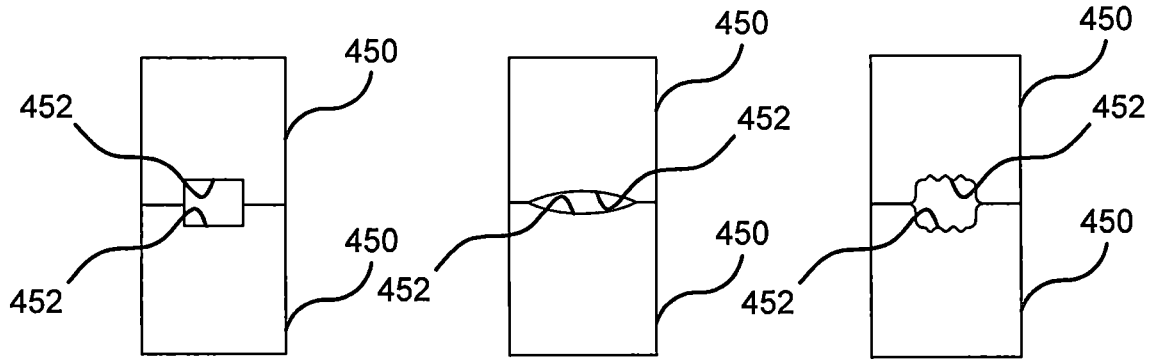

FIG. 15 illustrates an exemplary stator lamination stack 80, including coils 20 of FIG. 1, with a manifold 82 according to one embodiment of this invention. Coils 20 are placed about the lamination stack 80, with ends 28 and cooling channels 30 and 32 exposed on opposing sides. Manifold 82 includes a cap 84 over each end 28. Each cap 84 includes a coolant inlet 86 and/or a coolant outlet 88, passing though the cap 84 to introduce coolant fluid to the corresponding coil 20. The introduced coolant cools the ends 28 and passes through the channels 30 and 32 to the opposing side, where the cap 84 includes an outlet 88 for removing and/or recycling the coolant. Various sizes, shapes, and configurations are available for the manifold. For example, the manifold can include a single, circular cap element instead of the individual caps shown. In embodiments of this invention, the manifold 82 is overmolded on the lamination stack, such as by any known molding technique (e.g., additive manufacturing).

In embodiments of this invention, the coil alternatively or additionally includes one or more central cooling channels, such as fully surrounded on all sides by wire turn segments. Cooling channels in the middle of the coil, and thus the stator slot, can be formed, for example, by forming two separate subwinding pieces 450 each with a cooling channel feature 452. FIGS. 16A-F shows various shapes, as described above, of channels formed of two subwinding halves having matching or otherwise coordinating channel shapes. The coil subwindings may have the same electrical excitation or different electrical excitation. The two halves can be pressed together, or preferably adhered or varnished together, such as using a suitable coil resin material.

Figures 17, 18:
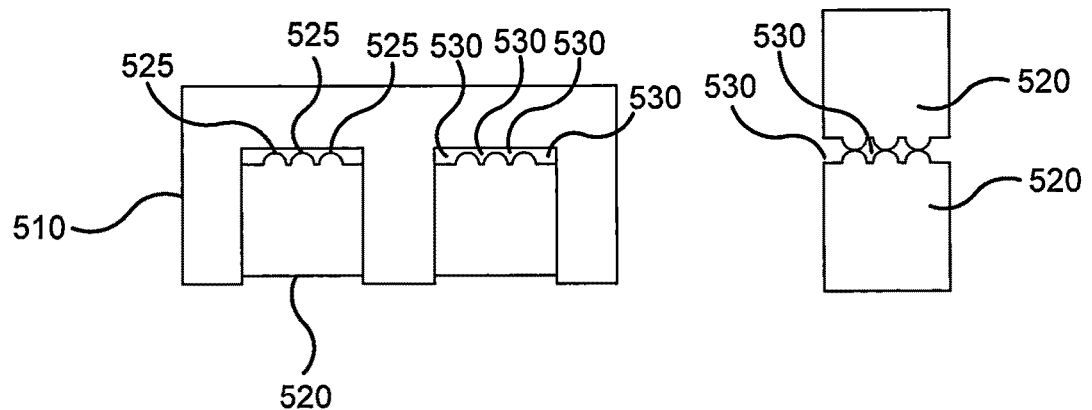
FIG. 17 shows a cross sectional view of a coil cooling channel, according to one embodiment of this invention.
FIG. 18 shows a cross sectional view of a coil cooling channel, according to one embodiment of this invention.

FIG. 17 shows a coil 520 having three longitudinally extending protuberances 525, e.g., a reverse configuration of the groove channels in FIG. 1, formed by a negative surface in the die. When applied against a stator 510, such as shown in FIGS. 13 and 14, the protuberances 525 form four channels 530, separated by the protuberances. FIG. 17 shows two matching halves of coil 520 together, with corresponding protuberances 525 contacting to form the central channels 530 between the two partial subcoils.

Figures 19, 20:
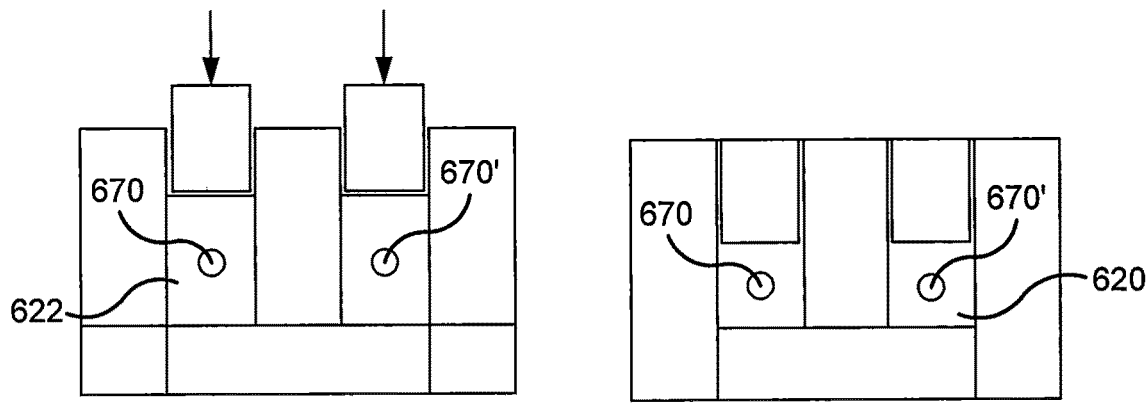
FIGS. 19 and 20 illustrate a winding compression, according to one embodiment of this invention.
Figures 21, 22:
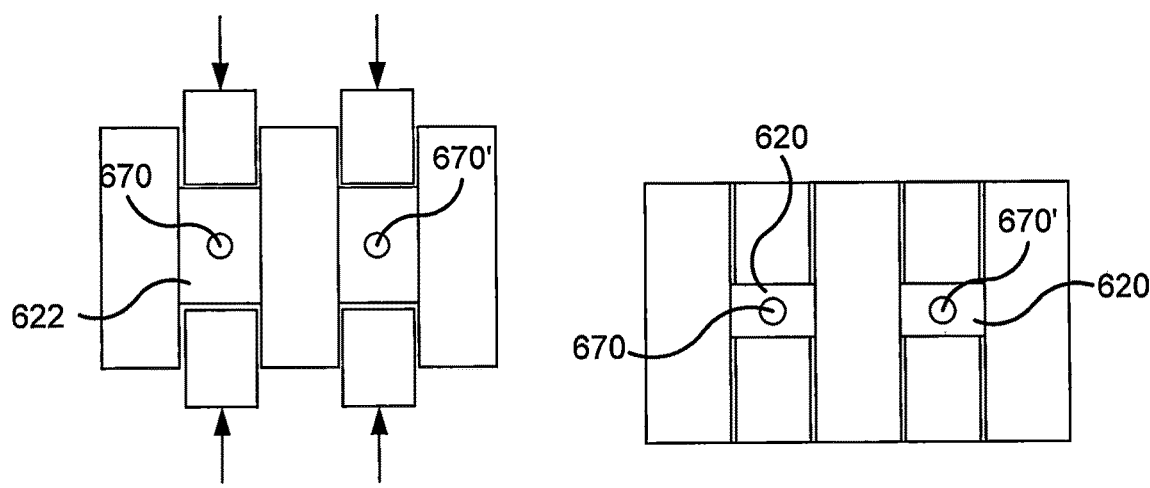
FIGS. 21 and 22 illustrate a winding compression, according to one embodiment of this invention.

To form a single compressed coil with an internal cooling channel (i.e., at least not fully open on one coil side) an additional shaping object can be inserted into the pre-compression wire winding, compressed with the coil and extracted. FIGS. 19-22 show an exemplary wire winding 622 pressing with central shaping elements 670 and 670'. In FIGS. 19 and 20, the pressing is performed from one side. In FIGS. 20 and 21, the wire winding 622 pressing about the central elements 670 and 670' is from both sides. The central shaping element 670 must either move with the wires as they are compressed in the die or the wires must flow around the element 670 during compression. If multi-direction compression is used, such as in FIGS. 21 and 22, the shaping element 670 may be able to remain stationary during the compression process. The shaping element can be a cylindrical rod, preferably coated with a nonstick material (e.g., PTFE-nitride) to promote removal.

Various sizes, shapes, amounts, and/or configurations of the cooling channels are also available, depending on need. The central channel can also be used in combination with at least one surface groove, either connected continually or sporadically along a length, or fully separate along a length.

Figure 23:
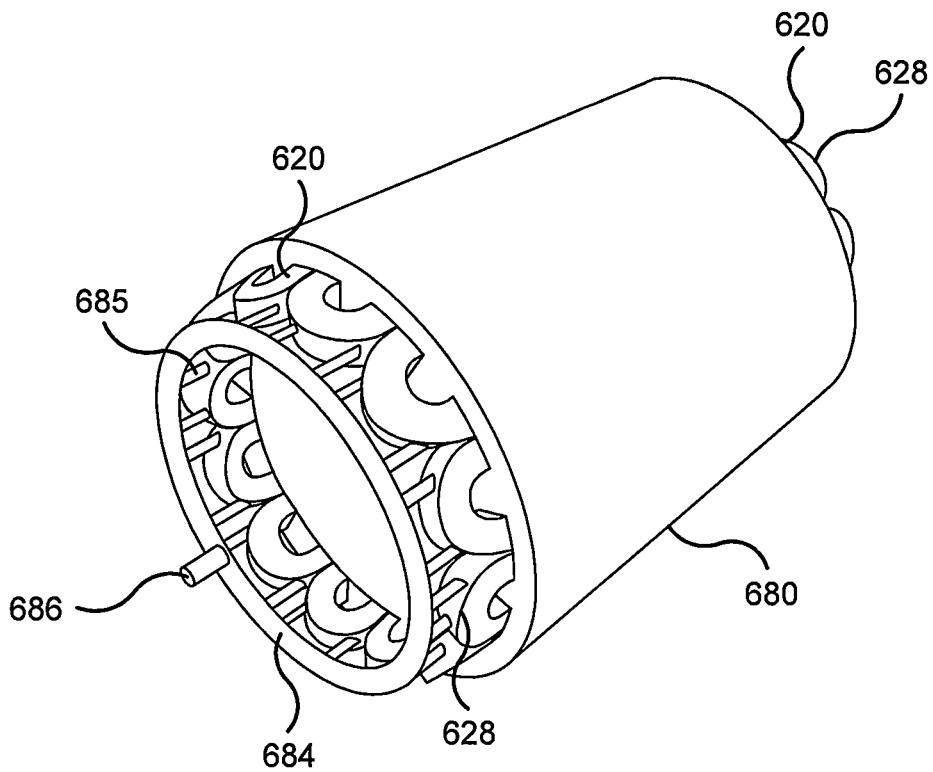
FIGS. 23 and 24 illustrate an exemplary manifold according to one embodiment of this invention.
Figure 24:
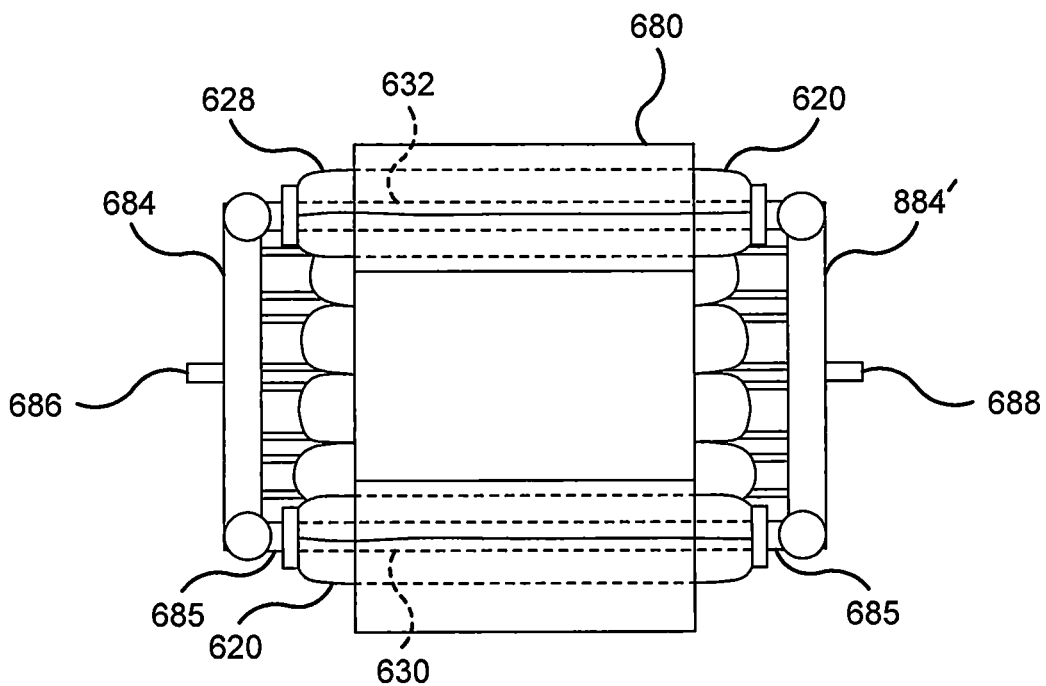

FIGS. 23 and 24 illustrate an exemplary manifold for a central cooling channel Coils 620 are placed about the lamination stack 680, with coil ends 628 and corresponding ends of the cooling channels 630 and 632 exposed on opposing sides. Manifold 682 includes a ring 684 with tube extension 685 that fit over and/or into (e.g., via a plug-like fitting) a corresponding one of the cooling channels 630 and 632. The ring 684 includes a coolant inlet 686 and/or a coolant outlet 688 to introduce coolant fluid to the coils 620. The introduced coolant passes through the channels 630 and 632 to the opposing side, where a similar opposing ring 684' includes an outlet 688 for removing and/or recycling the coolant.

Thus, the invention provides a winding coil for electrical applications with enhanced cooling. The cooling channel can be applied in various configurations depending on need. The cooling channel provides a relatively easy to apply cooling feature, adaptable to various winding coil shapes.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A coil for an electric application, the coil comprising:
   a winding including a plurality of superposed winding turns of at least one wire fully wound a plurality of times about a winding axis, the winding having a first turn end and a second turn end on an opposite end of the first turn end, wherein the winding comprises a cooling channel extending a length of the winding and disposed between adjacent turn segments of the plurality of superposed winding turns, the cooling channel including a first end opening at the first turn end and configured to receive a coolant flow, and the cooling channel including a second end opening at an opposite end of the cooling channel.

2. The coil of claim 1, wherein the wire winding is compressed at least partially about the cooling channel.

3. The coil of claim 1, wherein the cooling channel extends at least substantially perpendicular to the winding axis.

4. The coil of claim 1, wherein an outer side of the winding comprises the cooling channel.

5. The coil of claim 4, wherein the cooling channel comprises a channel groove in the outer side of the winding.

6. The coil of claim 1, wherein the cooling channel is formed between at least two protuberances extending from an outer side of the winding.

7. The coil of claim 1, wherein the cooling channel is surrounded on all sides by a plurality of winding turns.

8. The coil of claim 1, further comprising a closure covering the cooling channel.

9. The coil of claim 8, wherein the cooling channel is configured to face a stator frame, and the stator frame covers and closes the cooling channel.

10. The coil of claim 1, wherein the cooling channel is press-formed into the wire winding.

11. The coil of claim 1, wherein the cooling channel is formed between two partial windings or separate coils.

12. The coil of claim 1, further comprising a manifold disposed over the first end opening at the first turn end, the manifold disposed over to the cooling channel to deliver the coolant flow.

13. The coil of claim 1, wherein the second end opening is at the second turn end.

14. The coil of claim 1, further comprising:
   a stator frame including a first frame side and an opposing second frame side, and securing the coil with the first turn end extending outward from, and exposed on, the first frame side and the second turn end extending outward from, and exposed on, the second frame side; and
   a manifold including a cap disposed over the exposed first turn end and configured to deliver the coolant flow to the first end opening of the cooling channel.

15. The coil of claim 14, wherein the manifold further comprises an outlet disposed over the second end opening of the cooling channel.

16. The coil of claim 14, wherein the manifold further comprises a second cap disposed over the exposed second turn end.

17. A method of forming a coil for an electric application, the method comprising:
   winding a wire about a bobbin element to obtain a wire winding including a plurality of superposed winding turns of the wire fully wound a plurality of times about the bobbin element, the winding having a first turn end and a second turn end on an opposite end of the first turn end;
   compressing the wire winding against a shaping element, wherein the shaping element forms a channel groove in the wire winding and disposed between adjacent turn segments of the plurality of superposed winding turns, the channel groove including a first end opening at the first turn end and configured to receive a coolant flow, and the channel groove including a second end opening at an opposite end of the cooling groove.

18. The method of claim 17, wherein the wire winding is compressed at least partially about a cooling channel.

19. The method of claim 17, further comprising inserting the coil into a stator frame with the channel groove facing the stator frame.

20. The method of claim 17, further comprising:
   inserting the coil into a stator frame; and
   molding a manifold over the first turn end, wherein the manifold is configured to introduce a coolant to the cooling channel.

* * * * *